(12) United States Patent  
Ryu et al.

(10) Patent No.: US 8,886,260 B2  
(45) Date of Patent: Nov. 11, 2014

(54) TERMINAL AND CALL PROVIDING METHOD THEREOF

(75) Inventors: Jae Hun Ryu, Gwangmyeong-si (KR); Hye Mi Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1303 days.

(21) Appl. No.: 12/463,826

(22) Filed: May 11, 2009

(65) Prior Publication Data

US 2010/0053301 A1  Mar. 4, 2010

(30) Foreign Application Priority Data

Sep. 2, 2008  (KR) ........................ 10-2008-0086169

(51) Int. Cl.

| | |
|---|---|
| *H04M 1/00* | (2006.01) |
| *H04N 7/14* | (2006.01) |
| *H04M 1/725* | (2006.01) |
| *H04L 12/58* | (2006.01) |
| *H04M 1/02* | (2006.01) |
| *H04M 1/2745* | (2006.01) |
| *H04N 5/44* | (2011.01) |
| *H04M 1/57* | (2006.01) |

(52) U.S. Cl.

CPC ............. *H04N 7/147* (2013.01); *H04M 1/0214* (2013.01); *H04M 1/274508* (2013.01); *H04M 1/72522* (2013.01); *H04L 12/5895* (2013.01); *H04M 2250/16* (2013.01); *H04M 2250/22* (2013.01); *H04M 2250/12* (2013.01); *H04L 51/38* (2013.01); *H04N 5/44* (2013.01); *H04M 1/575* (2013.01)

USPC .......................... 455/567; 455/566; 348/14.02

(58) Field of Classification Search

CPC .... H04N 7/147; H04L 51/38; H04L 12/5895; H04M 1/575; H04M 1/72519; H04M 1/72552; H04M 1/72586; H04M 2250/12; H04M 2250/16; H04M 2250/22

USPC .......... 348/14.01, 14.02, 14.03, 14.11, 14.07, 348/14.12, 14.13; 370/352, 353, 356, 260, 370/261, 262; 455/414.1, 415, 567, 456.1, 455/566, 574; 379/88.11, 88.12, 202.01, 379/203.01, 204.01; 715/753

See application file for complete search history.

(56) References Cited

U.S. PATENT DOCUMENTS

| | | | |
|---|---|---|---|
| 6,253,075 B1 * | 6/2001 | Beghtol et al. ................ 455/415 |
| 8,280,028 B1 * | 10/2012 | Shusterman et al. .... 379/221.14 |
| 2005/0108642 A1 * | 5/2005 | Sinclair, II .................... 715/700 |
| 2005/0141686 A1 * | 6/2005 | Matsunaga et al. ....... 379/142.01 |
| 2006/0029051 A1 * | 2/2006 | Harris et al. .................. 370/356 |
| 2007/0218859 A1 * | 9/2007 | Wang .......................... 455/343.1 |
| 2007/0291667 A1 * | 12/2007 | Huber et al. .................. 370/260 |
| 2008/0247767 A1 * | 10/2008 | Scrafford et al. ................ 399/8 |
| 2009/0005077 A1 * | 1/2009 | Forstall et al. ............. 455/456.1 |
| 2009/0197615 A1 * | 8/2009 | Kim et al. ................... 455/456.1 |
| 2009/0290573 A1 * | 11/2009 | Belling et al. ................ 370/352 |

OTHER PUBLICATIONS

IBM, Electronic Phone Book for Video Conferencing, Jun. 1993, IBM Technical Disclosure Bulletin, 36-6A, 57-62.*

* cited by examiner

*Primary Examiner* — George Eng  
*Assistant Examiner* — Hung Du  
(74) *Attorney, Agent, or Firm* — KED & Associates LLP

(57) ABSTRACT

A terminal and a call providing method may be provided in which a calling terminal transmits both a video call and a voice call to a called terminal. A controller may generate a message for transmitting both a video call and a voice call to a selected contact information and a wireless communication unit may transmit the message generated by the controller to a called terminal that matches the selected contact information.

16 Claims, 15 Drawing Sheets

(a)

(b)

(c)

TERMINAL AND CALL PROVIDING METHOD THEREOF

This application claims priority from Korean Patent Application No. 10-2008-0086169, filed Sep. 2, 2008, the subject matter of which is hereby incorporated by reference.

BACKGROUND

1. Field

Embodiments of the present invention may relate to a terminal and a call providing method thereof.

2. Background

A mobile terminal may perform various functions. Examples of such functions may include data and voice communications, capturing images and video via a camera, recording audio, playing music files and outputting music via a speaker system, and displaying images and video on a display. Terminals may include additional functionality that supports game playing, while other terminals may also be configured as multimedia players. Mobile terminals may receive broadcast and multicast signals that permit viewing of content, such as videos and television programs.

Terminals may be classified into mobile terminals and stationary terminals according to a presence or non-presence of mobility. The mobile terminals may be further classified into handheld terminals and vehicle mount terminals according to availability for hand-carry.

Efforts are ongoing to support and increase functionality of mobile terminals. The efforts include software and hardware improvements, as well as changes and improvements in structural components that form the mobile terminal.

Terminals may be capable of video communication. Video communication is provided as a video communication function and a video chatting function to a user according to the video communication protocol by H.223, H.245, H.324M and/or the like.

Users may perform voice communication or exchange chatting with each other while viewing correspondent faces through the video communication terminals.

In a terminal supporting both video and voice communications, a key for providing a video communication and a key for providing a voice communication may be separately provided.

After a calling party has inputted an outgoing phone number, if the calling party presses the voice call key, a general voice call may be originated. On the other hand, if the video call key is pressed, a video call may be originated. Thus, the calling party may determine whether to make a phone call through the video call or the voice call.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
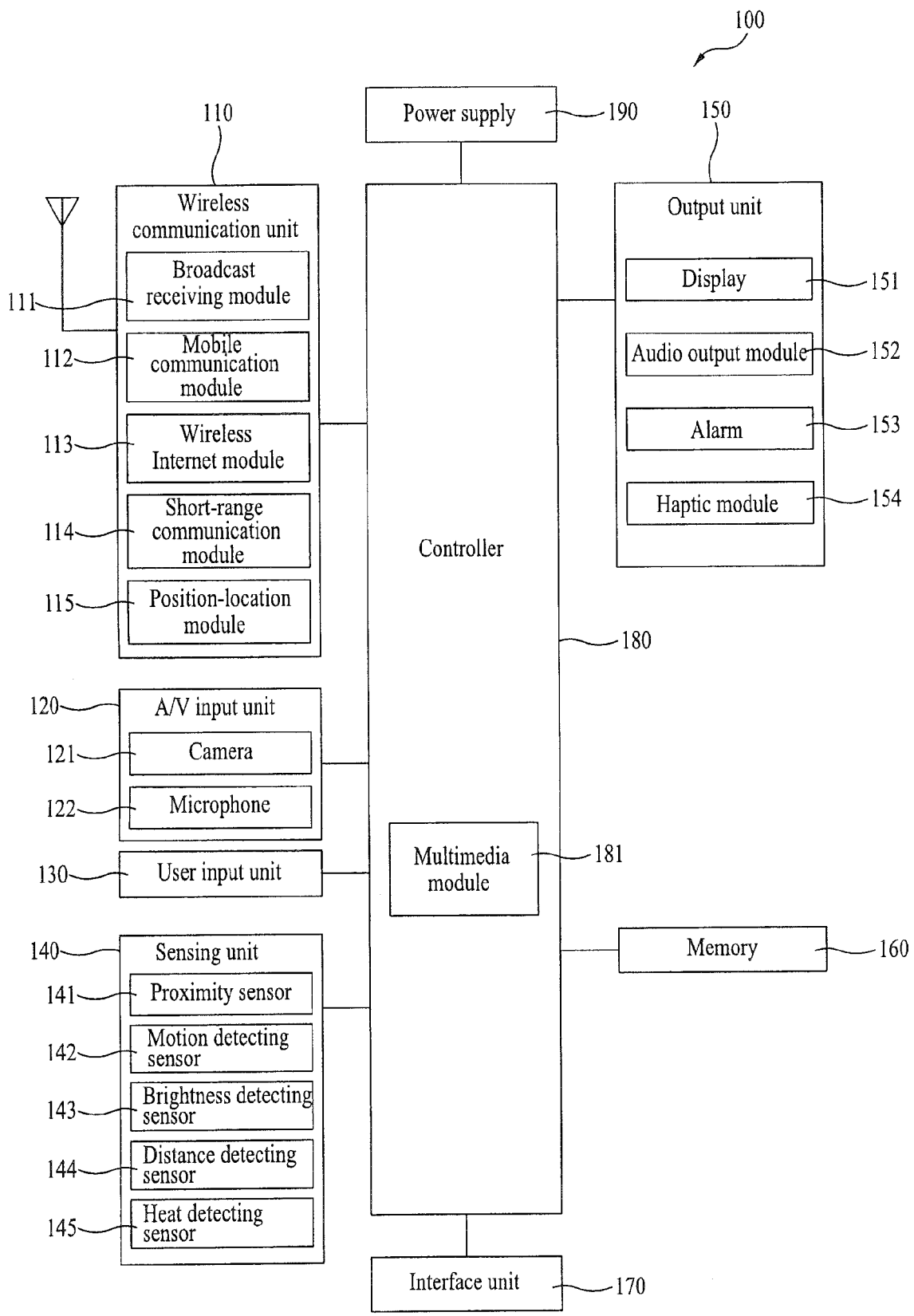
FIG. 1 is a block diagram of a mobile terminal according to an example embodiment.

Embodiments of the present invention may relate to a terminal and a call providing method thereof that substantially obviates one or more problems due to limitations and disadvantages of related art.

Embodiments of the present invention may provide a terminal and a call providing method thereof, in which a video call communication or a voice call communication may not be selected in a manner that a calling terminal transmits both a video call and a voice call to a called terminal.

Embodiments of the present invention may provide a terminal and a call providing method thereof, by which a called terminal is enabled to determine whether to make a video communication or a voice communication with a calling terminal.

A terminal may be provided that includes a controller. If a user selects contact information, the controller may generate a message for transmitting both a video call and a voice call to the selected contact information. The terminal may also include a wireless communication unit to transmit the generated message to a called terminal that matches the selected contact information.

A method may also be provided in a terminal. The method may include selecting at least one contact information, generating a message for transmitting both a video call and a voice call to the selected contact information, and transmitting the message to a called terminal that matches the selected contact information.

A terminal may be provided that includes a wireless communication module to receive a message including a video call and a voice call from a calling terminal. A display module may display information indicating that the video call and the voice call are received. If either the video call or the voice call is selected, a controller may perform an operation for connection and communication of the selected call by controlling the wireless communication unit.

A method may also be provided in a terminal. The method may include receiving a message including a video call and a voice call from a calling terminal, and displaying information identifying that the video call and the voice call are received. The method may also include performing an operation for connection and communication of the selected call if either the video call or the voice call is selected.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present invention may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyrosensor.

The brightness detecting sensor 143 may detect a brightness of light around the mobile terminal 100 and then output the detected brightness to the controller 180.

The distance detecting sensor 144 may include an ultrasonic sensor or the like. The distance detecting sensor 144 may measure a distance between the mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character and/or recognizing a picture drawing input performed on the touchscreen as an image.

The power supply 190 may receive an external or internal power and then supply the power required for operations of the respective elements under control of the controller 180.

Embodiments of the present invention explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
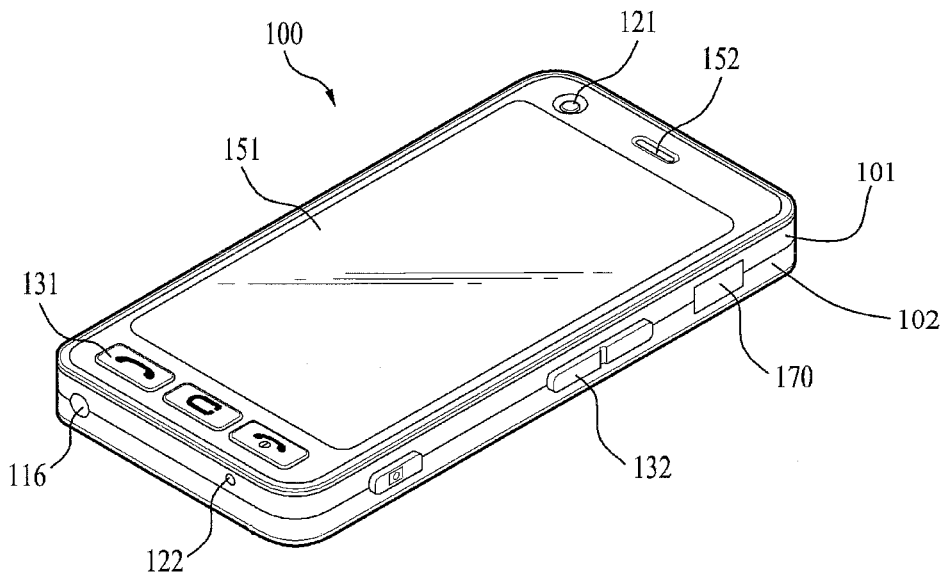
FIG. 2A is a front-view of a mobile terminal according to an example embodiment.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
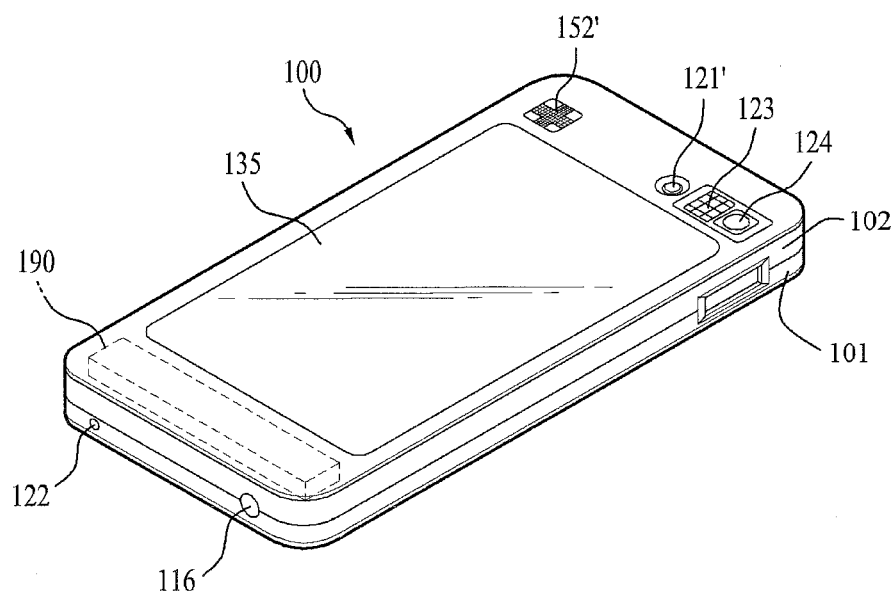
FIG. 2B is a perspective diagram of a backside of the mobile terminal shown in FIG. 2A.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 124 may be additionally provided at the lateral side of the terminal body as well as an antenna for communication or the like. The antenna 124 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 3A and 3B.

Figure 3A:
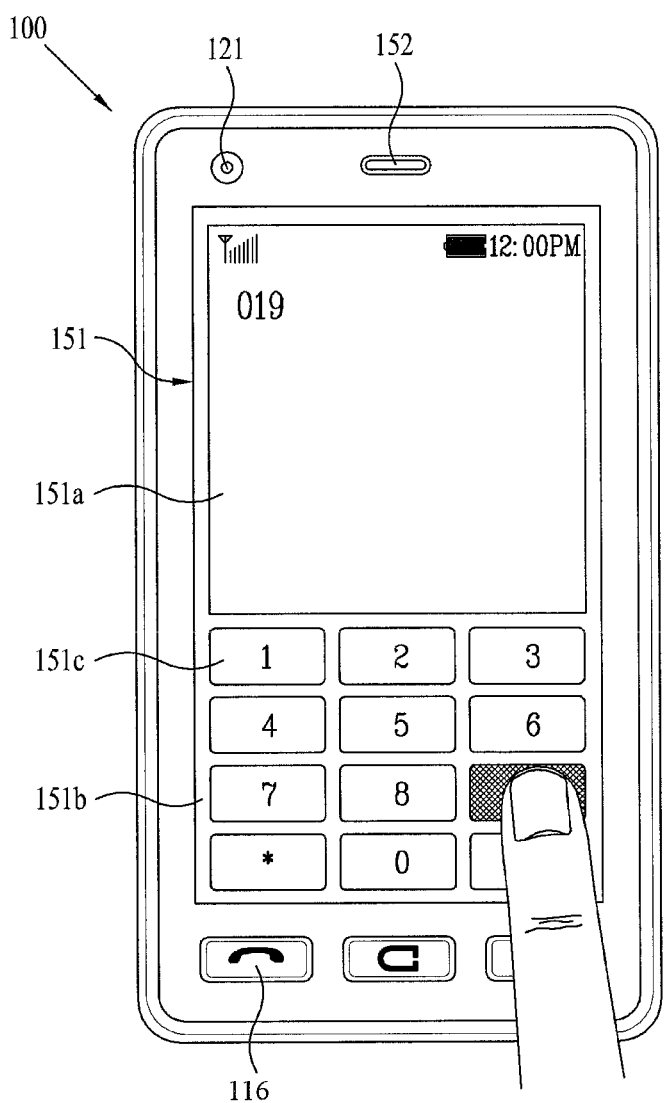
FIGS. 3A and 3B are front-view diagrams of a mobile terminal according to an example embodiment.
Figure 3B:
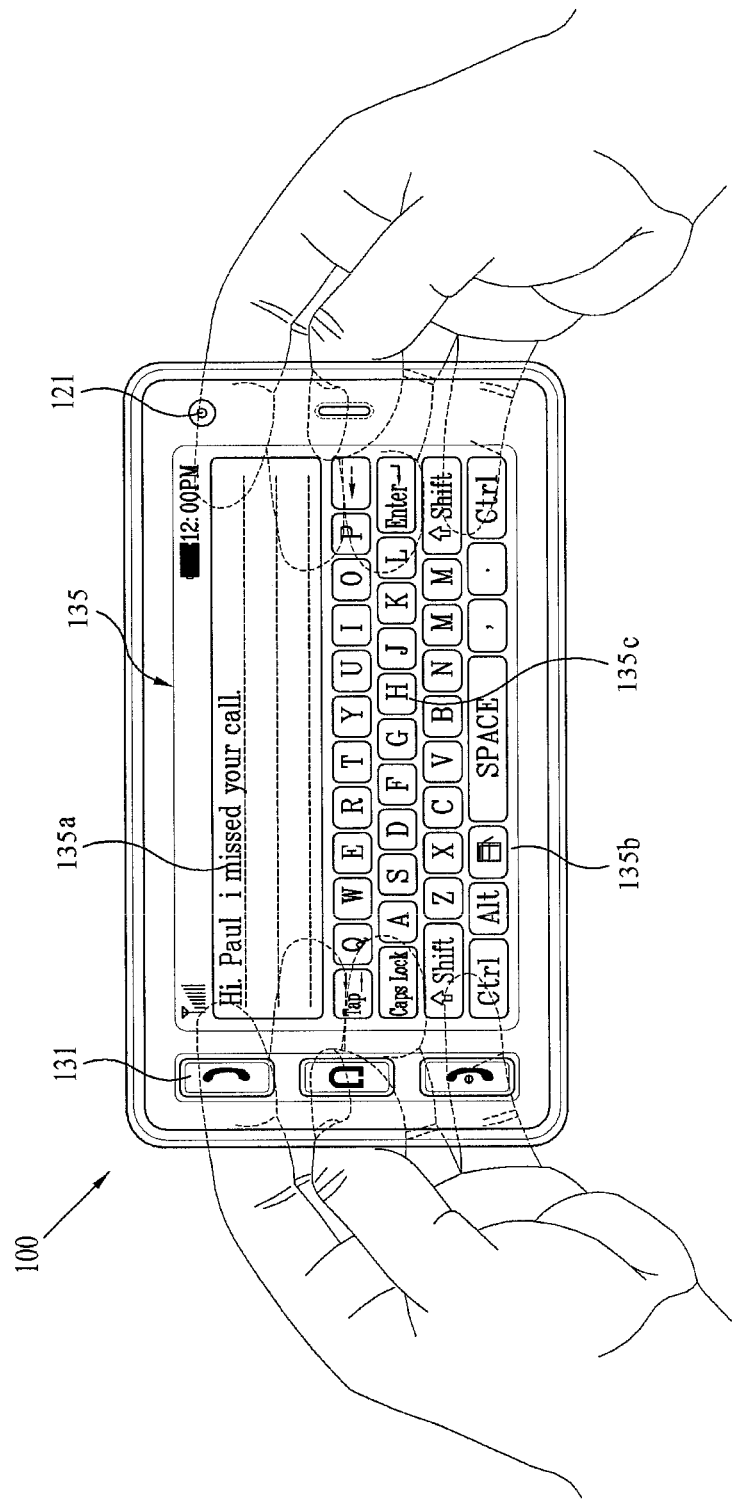

FIGS. 3A and 3B are front-view diagrams of a mobile terminal according to an example embodiment. Other embodiments, configurations and arrangements are also within the scope of the present invention.

Various kinds of visual information may be displayed on the display 151. The displayed information may be characters, numerals, symbols, graphics, icons and/or the like.

In order to input the information, at least one of the characters, numerals, symbols, graphics and icons may be represented as a single predetermined array to be implemented in a keypad formation. The keypad formation may be called soft keys.

FIG. 3A shows that an input touch may be applied to a soft key through a front face of a terminal body.

The display 151 may be operable through an entire area or may be divided into a plurality of regions. The plurality of the regions may be configured interoperable.

An output window 151a may be displayed on a top portion of the display 151 and an input window 151b may be displayed on a bottom portion of the display 151. A soft key 151c representing a digit for inputting a phone number or the like may be output to the input window 151b. If the soft key 151c is touched, a digit corresponding to the touched soft key may be outputted to the output window 151a. If the first manipulating unit 131 is manipulated, a call connection for a phone number displayed on the output window 151a may be attempted.

FIG. 3B shows that an input touch may be applied to a soft key through a rear face of a terminal body. FIG. 3A shows that the terminal body is vertically arranged (i.e., in a portrait manner). FIG. 3B shows that the terminal body is horizontally arranged (i.e., in a landscape manner). The display 151 may change an output picture according to the arranged direction of the terminal body.

FIG. 3B also shows that a text input mode is activated in the mobile terminal 100. FIG. 3B shows that the touchscreen 135 may include an output window 135*a* and an input window 135*b*. The output window 135*a* and the input window 135*b* may be displayed on the display 151. A plurality of soft keys 135*c* representing characters, symbols and/or digits may be arranged in the input window 135*b*. The soft keys 135*c* may be arranged in a QWERTY key formation.

If the soft keys 135*c* are touched using the touchpad 135, the characters, symbols and/or digits corresponding to the touched soft keys may be outputted to the output window 135*a*. Touch input via the touchpad 135 may be advantageous in that the soft keys 135*c* may be prevented from being blocked by a finger in case of touch, which is compared to the touch input via the display 151. If the display 151 and the touchpad 135 are transparent, the mobile terminal 100 may visually check or determine whether fingers are located at the backside of the terminal body. Hence, more correct touch inputs may be made.

The display 151 and/or the touchpad 135 may receive a touch input by scrolling. A user may scroll the display 151 or the touchpad 135 to shift a cursor or pointer located at an entity (e.g., icon or the like) displayed on the display 151. If a finger is shifted on the display 151 or the touchpad 135, a path of the shifted finger may be visually displayed on the display 151. This may be useful in editing an image displayed on the display 151.

If both the display (touchscreen) 151 and the touchpad 135 are touched together within a predetermined amount of time, a particular function of the mobile terminal 100 can be executed. The simultaneous touch may correspond to a case that the terminal body is held by a user using a thumb and a first finger (clamping). The function may include activation or deactivation for the display 151 or the touchpad 135.

The proximity sensor 141 described with reference to FIG. 1 may now be explained in detail with reference to FIG. 4.

Figure 4:
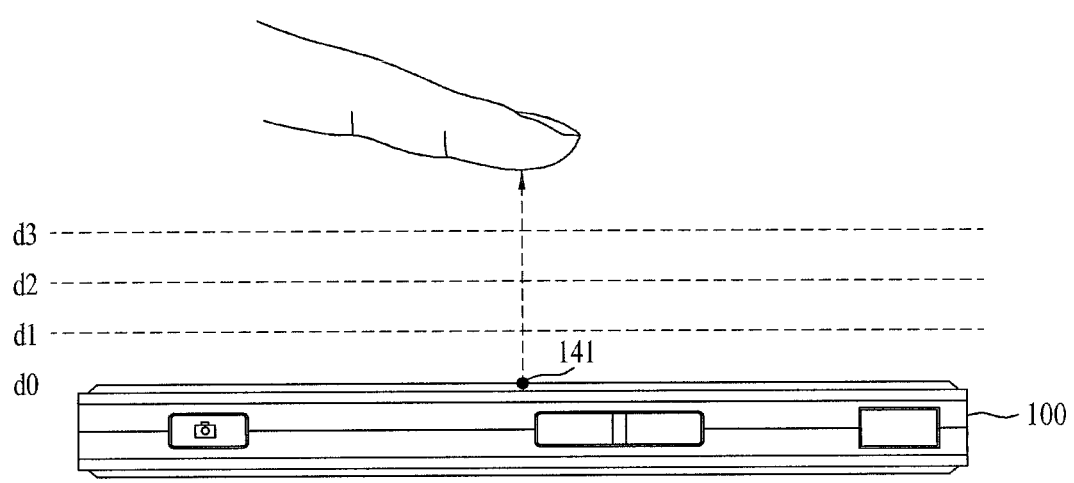
FIG. 4 is a diagram relating to a proximity depth of a proximity sensor.

FIG. 4 is a diagram relating to a proximity depth of a proximity sensor. Other embodiments, arrangements and configurations may also be used.

As shown in FIG. 4, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth).

FIG. 4 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

Figure 5:
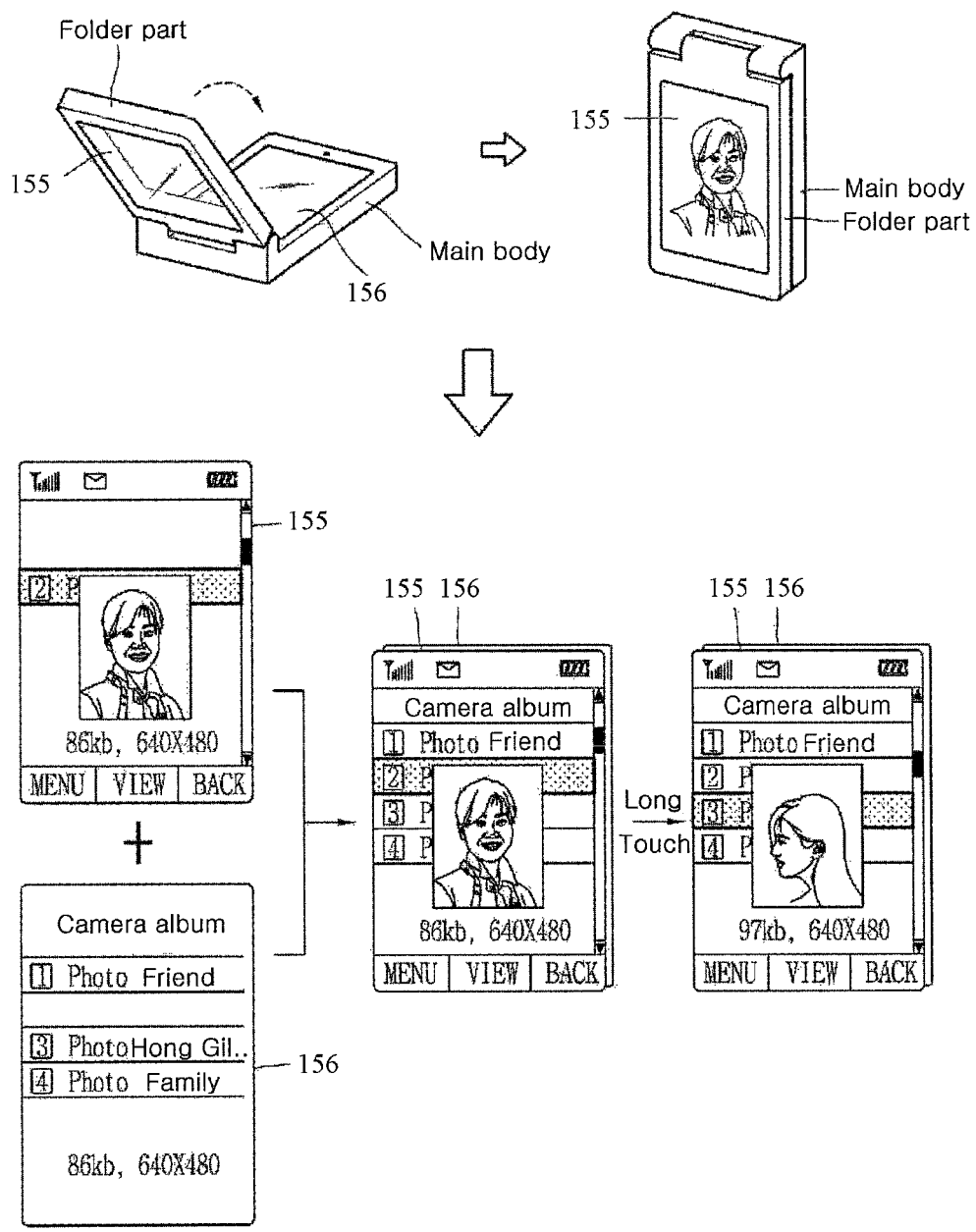
FIG. 5 is a diagram for exampling a method of controlling a touch action when a pair of display units overlap each other.

FIG. 5 is a diagram for exampling a method of controlling a touch action when a pair of display units 155 and 156 overlap each other.

FIG. 5 shows a folder type mobile terminal in which a folder part is connected to a main body in a manner of being folded or unfolded. The mobile terminal shown in FIG. 5 includes a first display unit 155 and a second display unit 156.

The first display unit 155 provided on the folder part may be a light-transmittive or transparent type (such as TOLED), and the second display unit 156 provided on the main body may be a non-transmittive type (such as LCD). Each of the first display unit 155 and the second display unit 156 may include a touch-inputtable touchscreen.

For example, if a touch (i.e., a contact touch or a proximity touch) to the first display unit (or TOLED) 155 is detected, the controller 180 may select or run at least one image from an image list displayed on the first display unit 155 (or TOLED) according to a touch type and a touch duration.

A method may now be described of controlling information displayed on a different display unit than the second display unit 156 (or LCD) in case of a touch to the first display unit (or TOLED) 155 externally exposed in an overlapped configuration. The description may be made with reference to input types classified into a touch, a long touch, a long-touch & drag and/or etc.

In the overlapped state (a state that the mobile terminal is closed or folded), the first display unit (or TOLED) 155 may overlap with the second display unit (or LCD) 156. In this state, if a touch different from a touch for controlling an image displayed on the first display unit (or TOLED) 155, e.g., a long touch (e.g., a touch having a duration of at least 2 seconds) is detected, the controller 180 may enable at least one image to be selected from an image list displayed on the second display unit (or LCD) 156 according to the touched input. The result from running the selected image may be displayed on the first display unit (or TOLED) 155.

The long touch may be usable in selectively shifting a specific one of entities displayed on the second display unit (or LCD) 156 to the first display unit (or TOLED) 155 (without an action for running the corresponding entity). In particular, if a user performs a long touch on a prescribed region of the first display unit (or TOLED) 155 corresponding to a specific entity of the second display unit (or LCD) 156, the controller 180 may control the corresponding entity to be displayed by being shifted to the first display unit (or TOLED) 155.

An entity displayed on the first display unit (or TOLED) 155 may be displayed by being shifted to the second display unit (or LCD) 156 according to a prescribed touch input to the first display unit (or TOLED) 155 such as flicking, swirling and/or the like. FIG. 5 shows a menu displayed on the second display unit (or LCD) 156 is shifted to the first display unit (or TOLED) 155.

In case of another input (e.g., a drag is additionally detected together with a long touch), the controller 180 may execute a function associated with an image selected by the long touch so that a preview picture for the image may be displayed on the first display unit (or TOLED) 155, for example. FIG. 5 shows a preview (i.e., a picture of a male) for a menu (i.e., an image file) may be performed.

While the preview image is outputted, if a drag (or movement) toward a different image is additionally performed on the first display unit (or TOLED) 155 by maintaining the long touch, the controller 180 may shift a selection cursor (or a selection bar) of the second display unit (or LCD) 156 and then display the image selected by the selection cursor on the preview picture (i.e., a picture of a female). Thereafter, after completion of the touch (i.e., long touch and drag), the controller 180 may display the initial image selected by the long touch.

The touch action (long touch and drag) may be identically applied to a case that a slide (i.e., an action of a proximity touch corresponding to the drag) is detected together with a long proximity touch (e.g., a proximity touch maintained for at least 2 or 3 seconds) to the first display unit (or TOLED) 155.

If a touch action differing from the above-mentioned touch actions is detected, the controller 180 may operate in a same manner as the general touch controlling method.

The method of controlling the touch action in the overlapped state may be applicable to a terminal having a single display. The method of controlling the touch action in the overlapped state may also be applicable to terminals differing from the folder type terminal having a dual display.

Figure 6A:
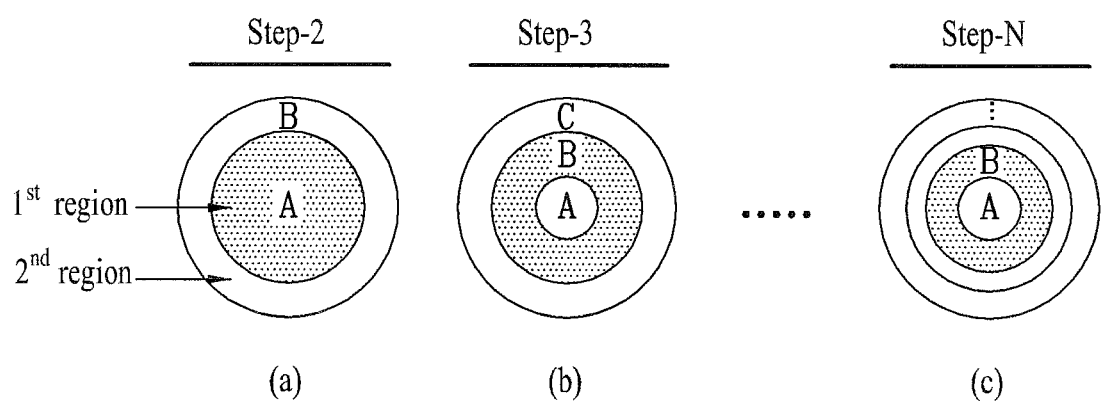
FIGS. 6A and 6B are diagrams relating to a proximity touch recognition area and a haptic effect generation region.
Figure 6B:
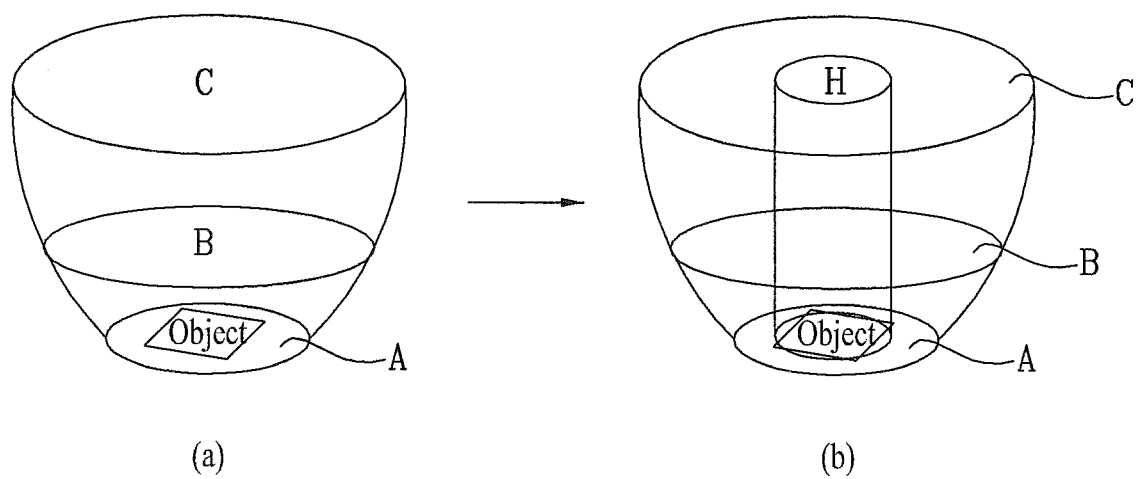

FIGS. 6A and 6B are diagrams relating to a proximity touch recognition area and a tactile effect generation region.

FIG. 6A represents an object such as an icon, a menu item, etc. in a circle type for ease of description.

As shown in FIG. 6A(a), a region for displaying an object on the display 151 may be divided into a first region A at a central part and a second region B that encloses (or surrounds) the first region A. The first and second regions A and B may be configured to generate tactile effects, such as strength or pattern, that differ from each other. For example, the first and second regions A and B may be configured to generate 2-step vibrations in a manner of outputting a first vibration when the second region B is touched or outputting a second vibration greater than the first vibration when the first region A is touched.

If both the proximity touch recognition region and the haptic region are simultaneously set in the region having the object displayed therein, the haptic region may be set for generating the tactile effect that is different from the proximity touch recognition region for detecting the proximity signal. In particular, the haptic region may be narrower or wider than the proximity touch recognition region. For example, in FIG. 6A(a), the proximity touch recognition region may be set to the area including both the first and second regions A and B. The haptic region may be set to the first region A.

As shown in FIG. 6A(b), the region having the object displayed therein may be divided into three regions A, B and C. Alternatively, the region having the object displayed therein may be divided into N regions (N>4) as shown in FIG. 6A(c). Each of the divided regions may generate a tactile effect having a different strength or pattern. If a region having a single object represented therein is divided into at least three regions, the haptic region and the proximity touch recognition region may be set to differ from each other according to a use environment.

A size of the proximity touch recognition region of the display 151 may be set to vary according to proximity depth. For example, FIG. 6B(a) shows the proximity touch recognition region is configured to decrease by C→B→A according to the proximity depth for the display 151. The proximity touch recognition region may also be configured to increase by C→B→A according to the proximity depth for the display 151. The haptic region may be set to have a predetermined size, such as the region 'H' in FIG. 6B(b), regardless of the proximity depth for the display 151.

In case of dividing the object-displayed region for setting of the haptic region or the proximity touch recognition region, one of various schemes of horizontal/vertical division, radial division and/or combinations thereof may be used as well as the concentric circle type division shown in FIG. 6A.

Embodiments for a control method in the mobile terminal 100 may now be described with reference to the accompanying drawings. Embodiments may be used singly and/or by being combined together. Embodiments may be implemented more easily when the display 151 includes the touchscreen.

First Example Embodiment

According to a first example embodiment of the present invention, a calling terminal may simultaneously transmit a video call and a voice call to a called terminal. When a user of the calling terminal sends a call to the called terminal, the user may not need to select either a video call communication or a voice call communication.

An operating process of a calling terminal may be explained in detail with reference to FIGS. 7 and 8.

Figure 7:
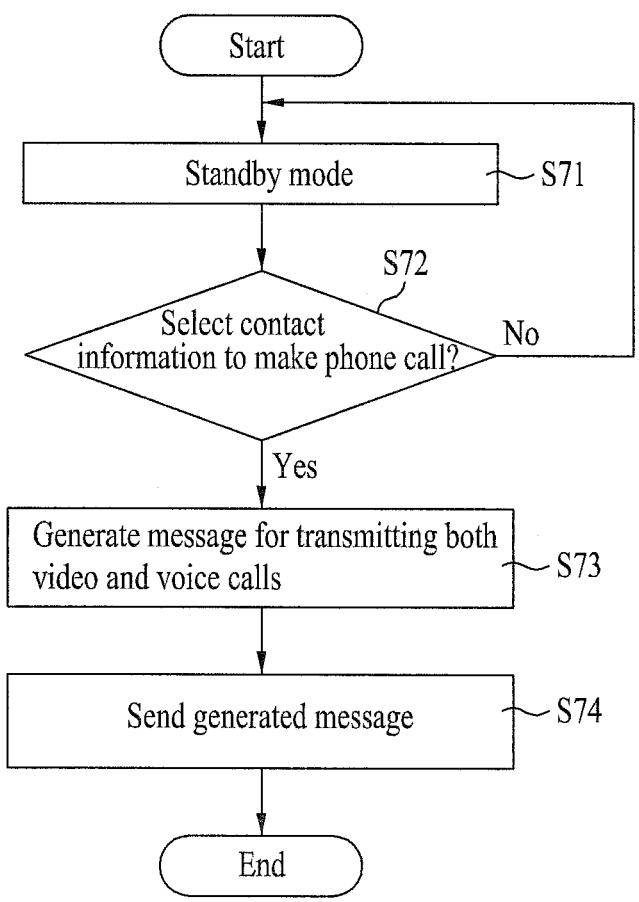
FIG. 7 is a flowchart of a method for providing a call of a calling terminal according to an example embodiment of the present invention.
Figure 8:
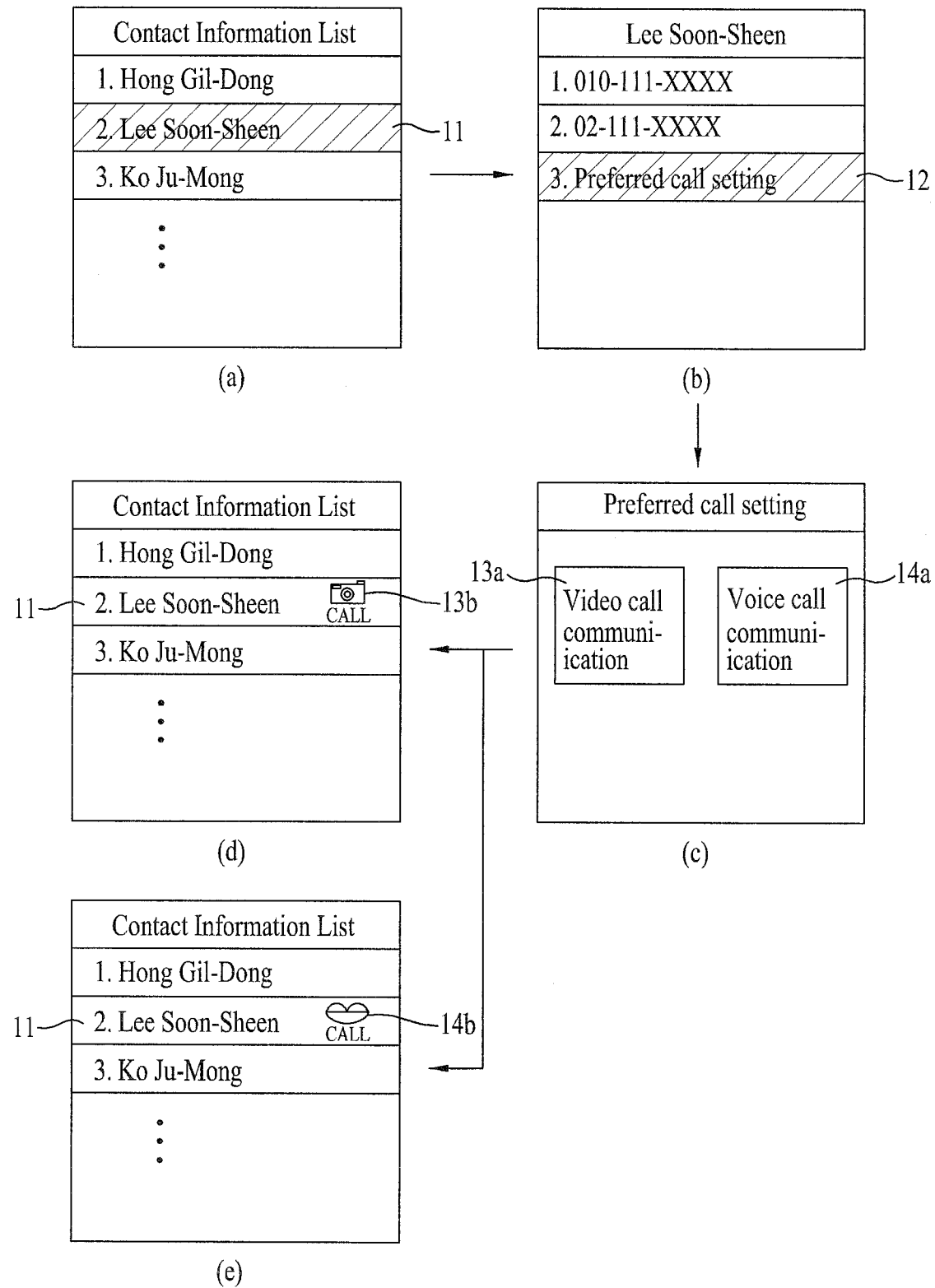
FIG. 8 is a diagram of a screen on which a processing setting a user-preferred call according to an example embodiment of the present invention.

FIG. 7 is a flowchart of a method for providing a call of a calling terminal according to an example embodiment of the present invention. FIG. 8 is a diagram of a screen on which a processing setting a user-preferred call according to an example embodiment of the present invention. Other embodiments, configurations and arrangements are also within the scope of the present invention.

The controller 180 of a calling terminal may be in a standby mode in operation S71. If the mobile terminal 100 is in the standby mode, a determination may be made whether contact address information of a called terminal is selected via the input unit 130 or the touchscreen 151. If the contact information is selected in operation S72, then a message may be generated in operation S73 for carrying both a video call and a voice call to the selected contact address information. The generated message may be sent in operation S74. If the contact information is not selected in operation S72, the mobile terminal may remain in the standby mode.

The contact address information may include a name of a called user, a mobile phone number, a home address, a fax number, an e-mail address, a homepage address and/or etc.

The contact address information may be selected from a phonebook provided to the memory 160 or the contact address information may be inputted by a user.

The generated message may be a call connection setting message. The controller 180 may set a parameter value for making a request for the video call connection in a first bearer capability (hereafter 'BC') of the call connection setting message and may also set a parameter value for making a request for the voice call connection in a second BC.

The message generating process of the controller 180 may now be described. The contact address information selecting process of the calling terminal user and a method for setting a preferred call in the selected contact address information may be explained with reference to FIG. 8.

FIG. 8(a) shows that a contact address information list is displayed on a screen. A user may select contact address information 11 using the user input unit 130 or the touchscreen 151. FIG. 8(b) shows that a menu corresponding to the selected contact information may be displayed. FIG. 8(b) also shows selection of a user-preferred call scheme 12 for the selected contact address information 11. The controller 180 may then display a first window 13a and a second window 14b, as shown in FIG. 8(c), to select a preferred call scheme from the video call communication and the voice call communication.

If the user selects the first window 13a for the video call communication, the controller 180 may display a first identifier 13b within the selected contact address information 11, as shown in FIG. 8(d). The first identifier 13b may indicate that the preferred call scheme for the user is the video call scheme. The controller 180 may then set the preferred call scheme to the video call scheme within the contact address information 11.

If the user selects the second window 14a for the voice call communication, the controller 180 may display a second identifier 14b within the selected contact address information 11, as shown in FIG. 8(e). The second identifier 14b may indicate that the preferred call scheme for the user is the voice call scheme. The controller 180 may then set the preferred call scheme to the voice call scheme within the contact address information 11.

The controller 180 may check a video call connection count and a voice call connection count for the contact address information 11 for a predetermined amount of time. The controller 180 may then set the preferred call scheme to the call having a higher call connection count.

The generation of the message (operation S73) and the method for setting the preferred call scheme (FIG. 8) in the message may now be explained with reference to Tables 1 to 3.

Table 1 shows an example for a configuration of a call connection setting message for a general voice call transmission.

TABLE 1

Call connection setting message for voice call transmission
SETUP for transmitting a voice call bc_repeat_ind_incl = 0 (0x0)
bearer_cap_1_incl = 1 (0x1)
bearer_cap_1
...
  ext_1 = 0 (0x0)
  rad_chan_reg = 3 (0x3)
  cording_std = 0 (0x0)
  xfer_mode = 0 (0x0)
...
bearer_cap_2_incl = 0 (0x0)
...

Referring to Table 1, 'bc_repeat_ind_incl=0 (0x0)' is an identifier that indicates whether a single BC or a plurality of BCs exist within the call connection setting message. Since Table 1 shows the call connection setting message for transmitting a voice call only, the single BC for the voice call transmission exists. Hence, the 'bc_repeat_ind_incl' is set to 0.

Additionally, 'bearer_cap_1_incl=1' and 'bearer_cap_1' are identifiers that indicate parameter values for the voice call connection are set within the first BC. Syntaxes below 'bearer_cap_1' are various parameter values for the voice call connection.

Finally, 'bearer_cap_2_incl=0' is an identifier that indicates that parameter values do not exist in the second BC.

Table 2 shows an example for a structure of a call connection setting message for a general video call transmission.

TABLE 2

Call connection setting message for video call transmission
SETUP for transmitting a video call bc_repeat_ind_incl = 0 (0x0)
bearer_cap_1_incl = 1 (0x1)
bearer_cap_1
other_itc = 0 (0x0)
other_rat_adapt = 1 (0x1)
spare_bit1 = 0 (0x0)
...
  int_rate = 3 (0x3)
  nic_on_tx = 0 (0x0)
  nic_on_rx = 0 (0x0)
  parity = 3 (0x3)
...
bearer_cap_1_incl = 1 (0x1)
...

Referring to Table 2, 'bc_repeat_ind_incl=0 (0x0)' is an identifier that indicates whether a single BC or a plurality of BCs exist within the call connection setting message. Since Table 2 shows the call connection setting message for transmitting a video call only, a single BC for the video call transmission exists. Hence, the 'bc_repeat_ind_incl' is set to 0.

Additionally, 'bearer_cap_1_incl=1' and 'bearer_cap_1' are identifiers that indicate parameter values for the video call connection are set within the first BC. Syntaxes below 'bearer_cap_1' are various parameter values for the video call connection.

Finally, 'bearer_cap_2_incl=0' is an identifier that indicates that parameter values do not exist in the second BC.

Table 3 shows an example for a structure of a call connection setting message for transmitting a video call and a voice call simultaneously according to an example embodiment of the present invention.

TABLE 3

Call connection setting message for transmitting video call
and voice call simultaneously
SETUP for transmitting a picture call and a voice call bc_repeat_ind_incl = 1 (0x0)
bearer_cap_1_incl = 1 (0x1)
bearer_cap_1
...
  - parameter value for video call connection -
...
bearer_cap_2_incl = 1 (0x1)
...
  - parameter value for voice call connection -
...
facility_incl = 0 (0x0)

Referring to Table 3, 'bc_repeat_ind_incl=0 (0x0)' is an identifier that indicates whether a single BC or a plurality of BCs exist within the call connection setting message. Since Table 3 shows the call connection setting message for transmitting a video call and a voice call simultaneously according to an example embodiment, the first BC for the video call transmission and the second BC for the voice call transmission both exist. Hence, the 'bc_repeat_ind_incl' is set to 1.

Additionally, 'bearer_cap_1_incl=1' and 'bearer_cap_1' are identifiers that indicate parameter values for the video call connection are set within the first BC. Syntaxes below 'bearer_cap_1' are various parameter values for the video call connection.

Finally, 'bearer_cap_2_incl=1' is an identifier that indicates that parameter values for the voice call connection are set within the second BC.

If the preferred call scheme of the user is the video call connection (as shown in FIG. 8(d)), the controller 180 may give a priority to the first BC, set the parameter values for the video call connection within the first BC, and set the parameter values for the voice call connection within the second BC. When the receiving side receives the message, the receiving side may recognize that the call scheme preferred by the caller is the video call set within the first BC.

If the preferred call scheme of the user is the voice call connection (as shown in FIG. 8(e)), the controller 180 may give a priority to the first BC, set the parameter values for the voice call connection within the first BC, and set the parameter values for the video call connection within the second BC. When the receiving side receives the message, the receiving side may recognize that the call scheme preferred by the caller is the voice call set within the first BC.

The controller 180 may control the wireless communication unit 110 so that the message created by the process shown in Table 3 may be transmitted, in operation S74 (FIG. 7), to the called terminal corresponding to the selected contact address information 11.

An operating process of a called terminal according to a second example embodiment of the present invention may now be explained in detail.

Second Example Embodiment

According to a second example embodiment of the present invention, a called terminal may be enabled to determine whether to perform a video call communication or a voice call communication with a calling terminal. An operating process of a called terminal may now be explained with reference to FIG. 9.

Figure 9:
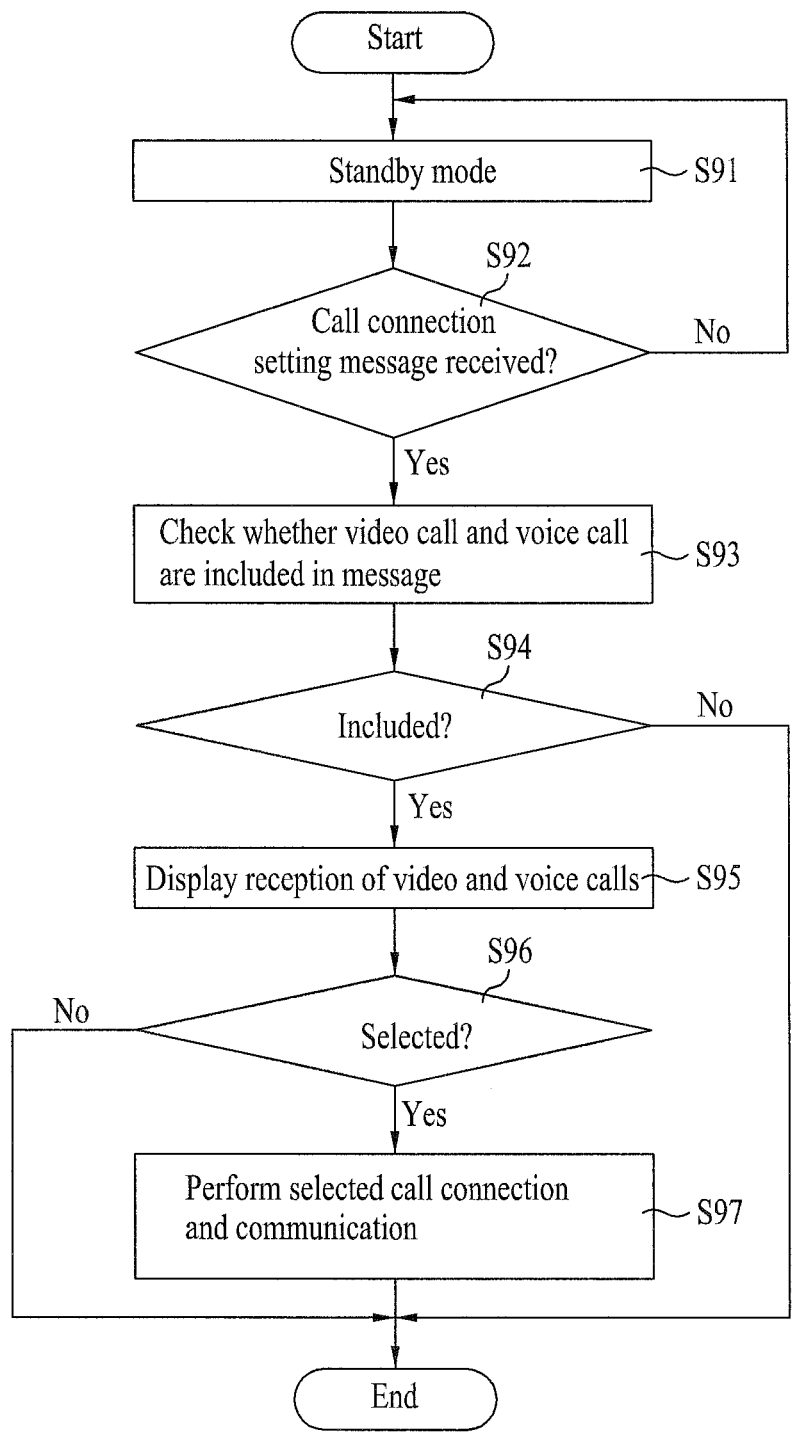
FIG. 9 is a flowchart of a method of providing a call of a called terminal according to an example embodiment of the present invention.

FIG. 9 is a flowchart of a method for providing a call of a called terminal according to an example embodiment of the present invention. Other embodiments, configurations and arrangements are also within the scope of the present invention.

The controller 180 of a called terminal may be in a standby mode in operation S91. If a call connection setting message is received from a calling terminal via the wireless communication unit 110 in operation S92, the controller 180 may check, in operation S93, whether both a video call and a voice call are included in the received call connection setting message.

The controller 180 may parse an identifier 'bc_repeat_ind_incl' from the call connection setting message.

If the 'bc_repeat_ind_incl' is set to 1, the controller 180 may recognize that both a first BC and a second BC exist within the received call connection setting message and the controller 180 may then parse parameters set within the first BC and the second BC.

By parsing the parameter values set within 'bearer_cap_1_incl' (first BC) and parameter values set within 'bearer_cap_2_incl' (second BC), the controller 180 may recognize that the video call is included in the first BC and may also recognize that the voice call is included in the second BC.

Thus, if it is determined in operation S94 that both the video call and the voice call are included within the call connection setting message, the controller 180 may display a first information 21 and a second information 22 on a screen of the display module in operation S95. The first information 21 may indicate that the video call has been received and the second information 22 may indicate that the voice call has been received.

If either the displayed first information 21 or the displayed second information 22 is selected in operation S96, the controller 180 may connect the selected call and then perform a call operation for the connected call in operation S97. An identifier 23 may be displayed to indicate that the first information is the call scheme preferred by the caller.

Figure 10:
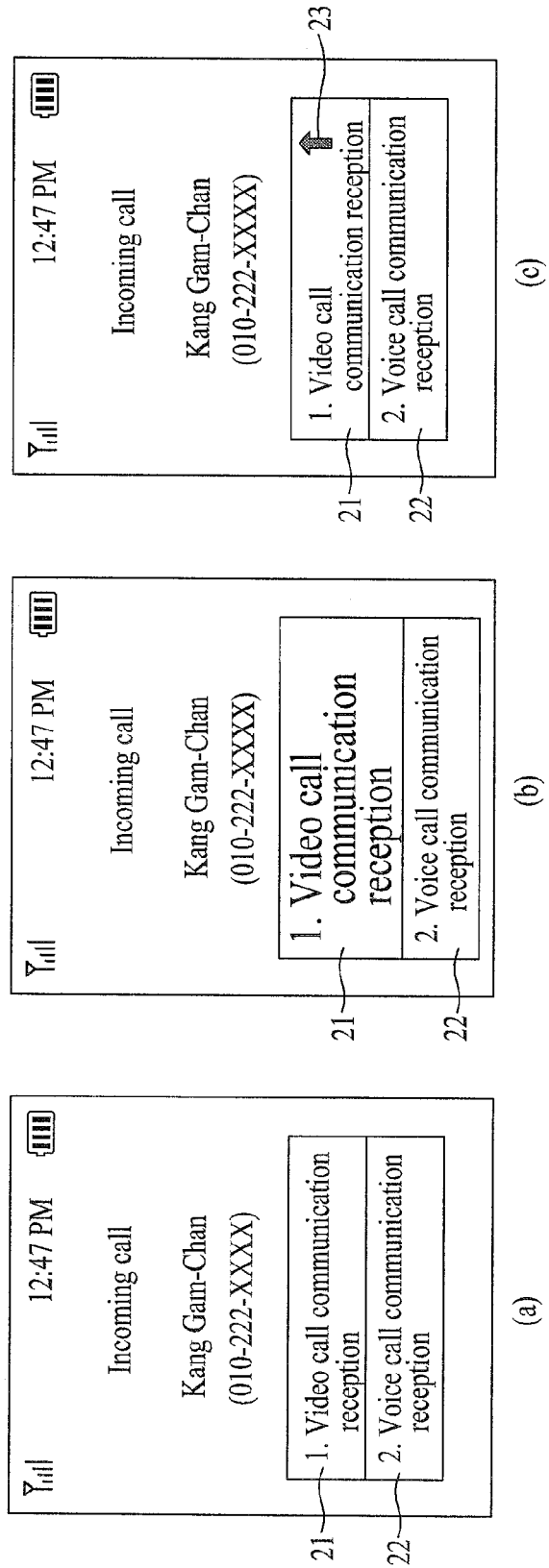
FIG. 10 is a diagram of a screen showing a method for displaying a reception of a video call and a reception of a voice call according to an example embodiment of the present invention.

A method for displaying a presence of receptions of the video call and the voice call may be explained with reference to FIG. 10. FIG. 10 is a diagram of a screen showing a method for displaying a reception of a video call and a reception of a voice call according to an example embodiment of the present invention.

As shown in FIG. 10(a), if a video call is included in a first BC within the received message and a voice call is included in a second BC within the received message, and since the call included in the first BC is a call scheme preferred by a caller, the controller 180 may enable a user to select the first information 21 indicating that the video call has been received in a manner of displaying the first information 21 with priority rather than the second information 22 indicating that the voice call has been received.

As shown in FIG. 10(b), the controller 180 may display the first information 21 such that the first information 21 is discriminated from the second information 22 by adjusting a displayed size, a displayed color, a font size and/or the like of the first information 21. The controller 180 may enable the user of the called terminal to select the first information 21.

As shown in FIG. 10(c), the controller 180 may display the identifier 23 for indicating that the video call scheme is the call scheme preferred by the caller within the first information 21. The controller 180 may enable the user of the called terminal to select the first information 21.

The controller 180 may select the video call communication or the voice call communication using the motion detecting sensor 142, the brightness detecting sensor 143, the distance detecting sensor 144 and/or the heat detecting sensor 145. The controller 180 may perform switching between the video call communication and the voice call communication using the same.

Figure 11:
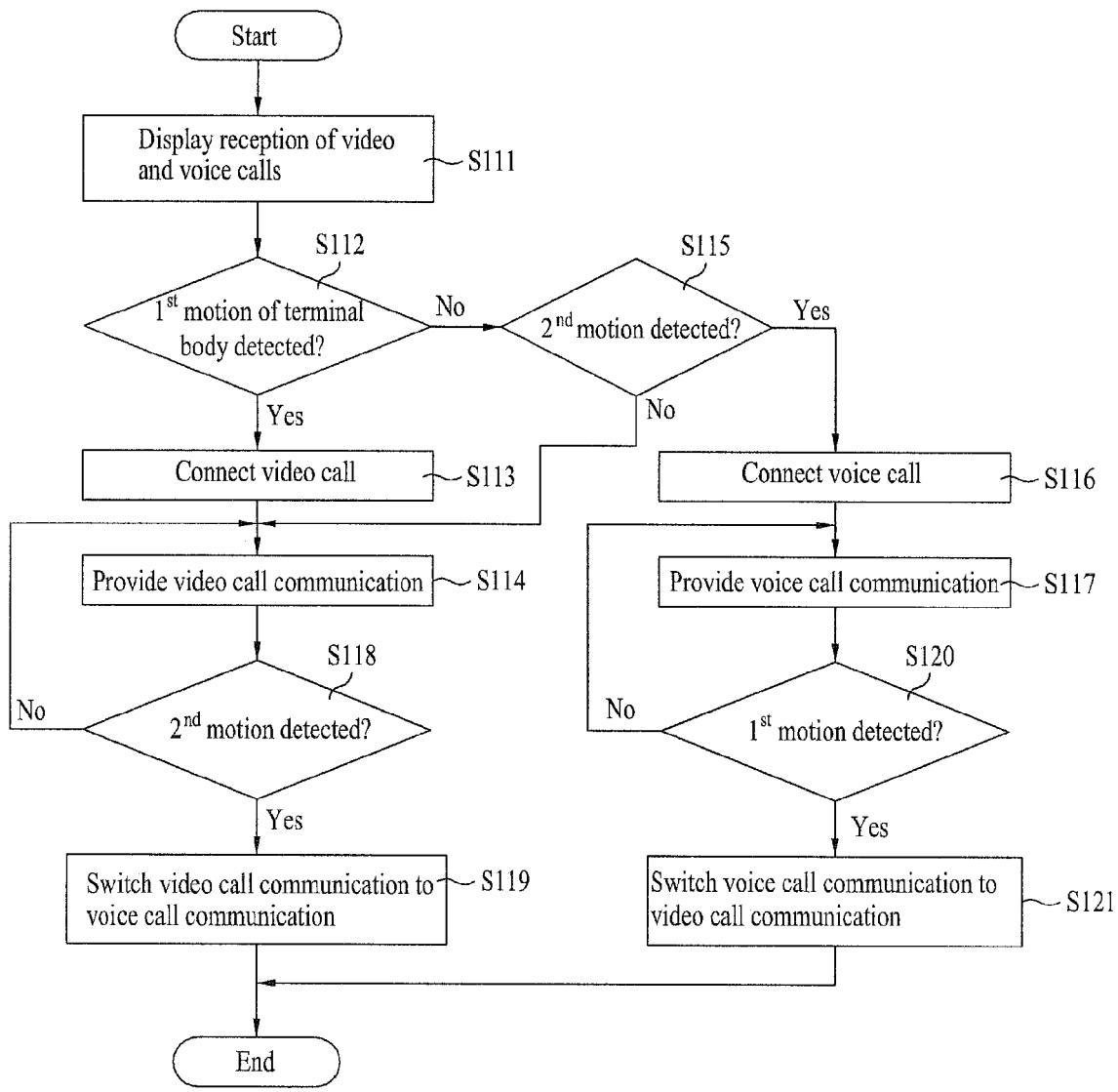
FIG. 11 is a flowchart of a method for switching a video call and a voice call using a motion detecting sensor according to an example embodiment of the present invention.

FIG. 11 is a flowchart of a method for switching a video call and a voice call using a motion detecting sensor according to an example embodiment of the present invention. Other embodiments, configurations and arrangements are also within the scope of the present invention.

The first and second informations 21 and 22 may be displayed in operation S111. If a first motion for the terminal body is detected via the motion detecting sensor 142 in operation S112, the controller 180 may connect the video call in operation S113 by regarding that the first information 21 is selected. The controller 180 may then provide a call operation for the connected video call in operation S114.

The first motion may be motion that corresponds to an action for a user to perform a video call communication such as by grabbing the terminal body with fingers. Alternatively, the first motion may be motion set by a user in advance.

On the other hand, if the first motion is not detected in operation S112 and a second motion for the terminal body is detected via the motion detecting sensor 142 in operation S115, then the controller 180 may connect the voice call in operation S116 by regarding that the second information 22 is selected. The controller 180 may then provide a call operation for the connected voice call in operation S117.

The second motion may be motion that corresponds to an action for a user to perform a voice call communication such as by grabbing the terminal body with fingers. Alternatively, the second motion may be motion set by a user in advance.

If the first motion is detected in operation S118 via the motion detecting sensor 142 in the course of providing the video call communication (in operation S114), the controller 180 may switch the video call communication to the voice call communication in operation S119.

If the first motion is detected in operation S120 via the motion detecting sensor 142 in the course of performing the voice call communication (in operation S117), the controller 180 may switch the voice call communication to the video call communication in operation S121.

Figure 12:
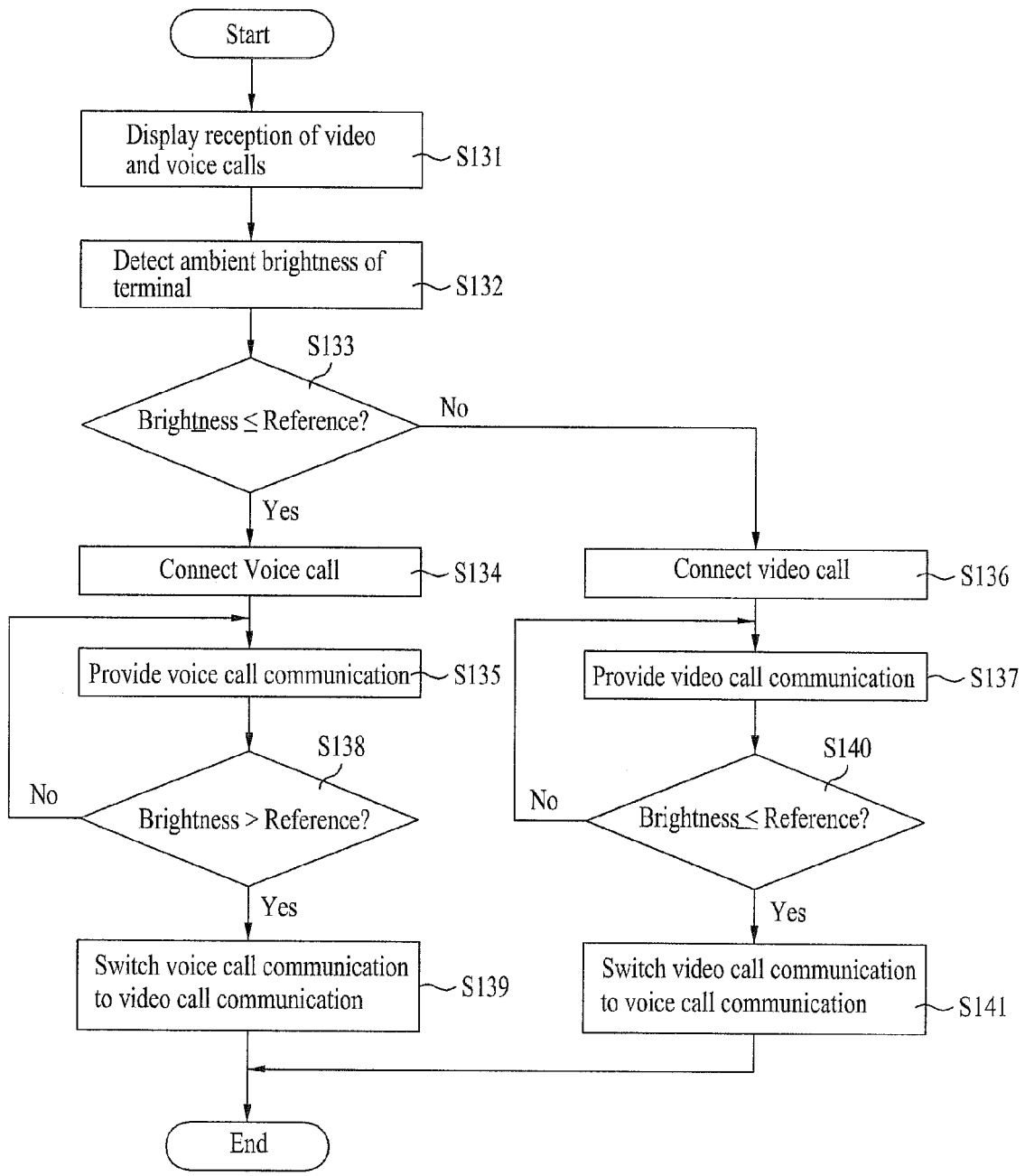
FIG. 12 is a flowchart of a method for switching a video call and a voice call using a brightness detecting sensor according to an example embodiment of the present invention.

FIG. 12 is a flowchart of a method for switching a video call and a voice call using a brightness detecting sensor according to an example embodiment of the present invention. Other embodiments, configurations and arrangements are also within the scope of the present invention.

The first and second informations 21 and 22 may be displayed in operation S131. The controller 180 may measure and/or detect brightness of ambient light around the terminal body by controlling the brightness detecting sensor 143 in operation S132.

If the brightness measured via the brightness detecting sensor 143 is equal to or less than a reference in operation S133, the controller 180 may connect a voice call in operation S134 by regarding that the second information 22 is selected. The controller 180 may then provide a call communication operation in operation S135 for the connected voice call.

The reference may be a brightness value of a state that a video call communication is not available due to a dark environment around the mobile terminal.

If the ambient brightness of the terminal is equal to or less than the reference, the video call communication may not be possible (or may be impractical) due to the dark environment around the terminal. The controller 180 may directly provide the voice call communication to the user.

If the brightness measured via the brightness detecting sensor 143 is greater than the reference in operation S133, a current ambient brightness of the terminal may be suitable for the video call communication. Therefore, the controller 180 may connect a video call in operation S136 by regarding that the first information 21 is selected. The controller 180 may then provide a call communication operation in operation S137 for the connected video call.

If the brightness re-measured in the course of the voice call communication of the operation S137 via the brightness detecting sensor 143 is greater than the reference in operation S138, a current ambient brightness of the terminal may be suitable for the video call communication. Therefore, the controller 180 may switch the voice call communication to the video call communication in operation S139.

If the brightness re-measured in the course of the video call communication of the operation S137 via the brightness detecting sensor 143 is equal to or less than the reference in operation S140, a current ambient brightness of the terminal may not be suitable for the video call communication due to the current low brightness around the mobile terminal. Therefore, the controller 180 may switch the video call communication to the voice call communication in operation S141.

Figure 13:
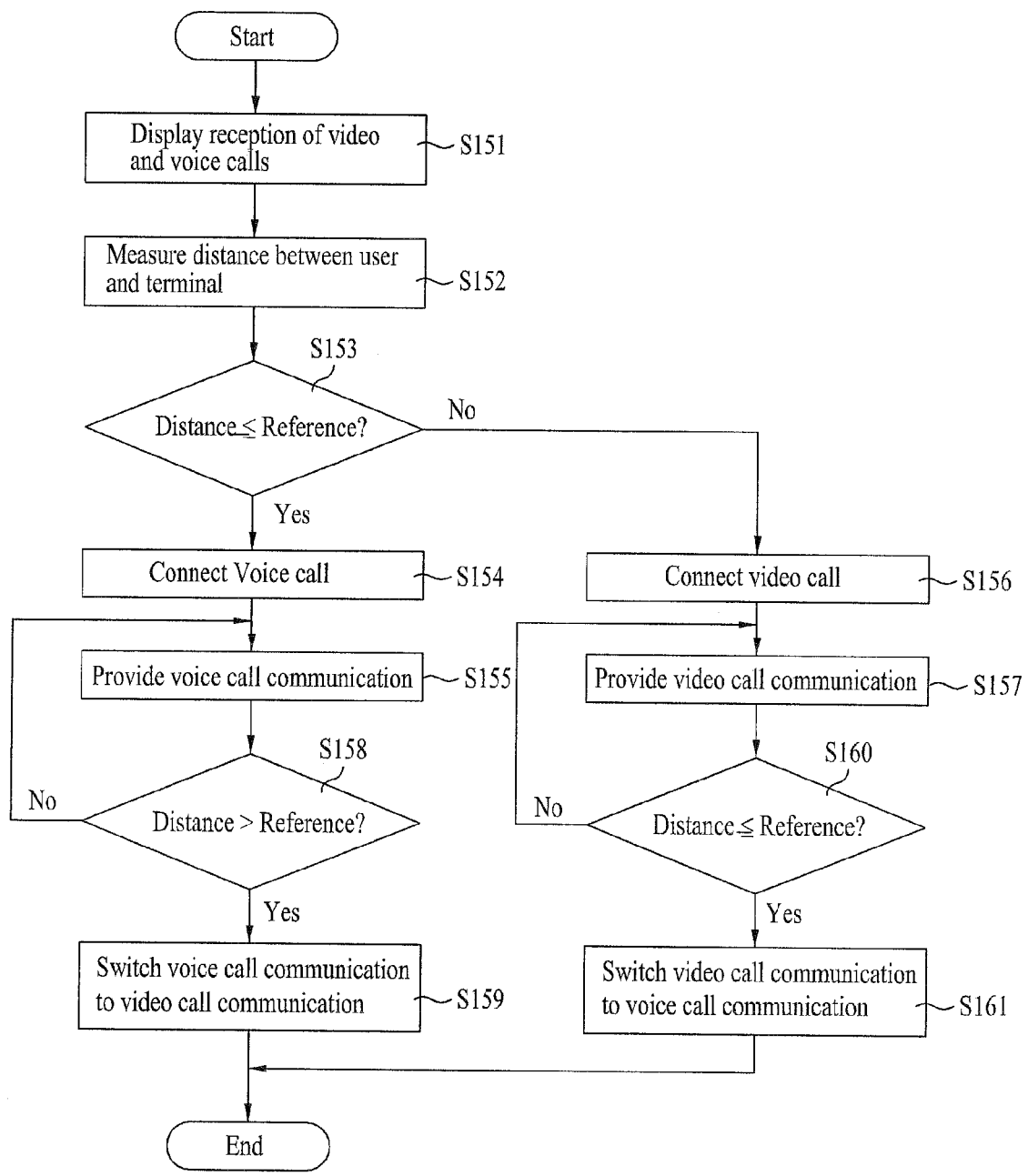
FIG. 13 is a flowchart of a method for switching a video call and a voice call using a distance detecting sensor according to an example embodiment of the present invention.

FIG. 13 is a flowchart of a method for switching a video call and a voice call using a distance detecting sensor according to an example embodiment of the present invention. Other embodiments, configurations and arrangements are also within the scope of the present invention.

The first and second informations 21 and 22 may be displayed in operation S151. The controller 180 may then measure in operation S152 a distance between a user and a terminal body using the distance detecting sensor 144.

If the distance measured via the distance detecting sensor 144 is equal to or less than a reference in operation S153, the controller 180 may connect a voice call in operation S154 by regarding that the second information 22 is selected. The controller 180 may then provide a call communication operation for the connected voice call in operation S155.

The reference may be a distance value suitable for the video call communication between the terminal body and the user.

When the distance between the terminal body and the user is equal to or less than the reference, this may be considered a state that an ear of the user is contacted with the audio output module 152 by holding the terminal body with fingers or may be considered a state that the video call communication is no possible (or is improbable) due to close distance between the user and the terminal. The controller 180 may provide the voice call communication to the user.

If the distance measured via the distance detecting sensor 144 exceeds the reference in operation S153, then a current distance between the terminal body and the user may be suitable for the video call communication. Therefore, the controller 180 may connect a video call in operation S156 by regarding that the first information 21 is selected. The controller 180 may then provide a call communication operation for the connected video call in operation S157.

If the distance re-measured in the course of the voice call communication (of operation S135) via the distance detecting sensor 144 is greater than the reference in operation S158, then a current distance between the terminal body and the user may be suitable for the video call communication. Therefore, the controller 180 may switch the voice call communication to the video call communication in operation S159.

If the distance re-measured in the course of the video call communication (of operation S157) via the distance detecting sensor 144 is equal to or less than the reference in operation S160, then a current distance between the terminal body and the user may not be possible (or may be improbable) for the video call communication. Therefore, the controller 180 may switch the video call communication to the voice call communication in operation S161.

Figure 14:
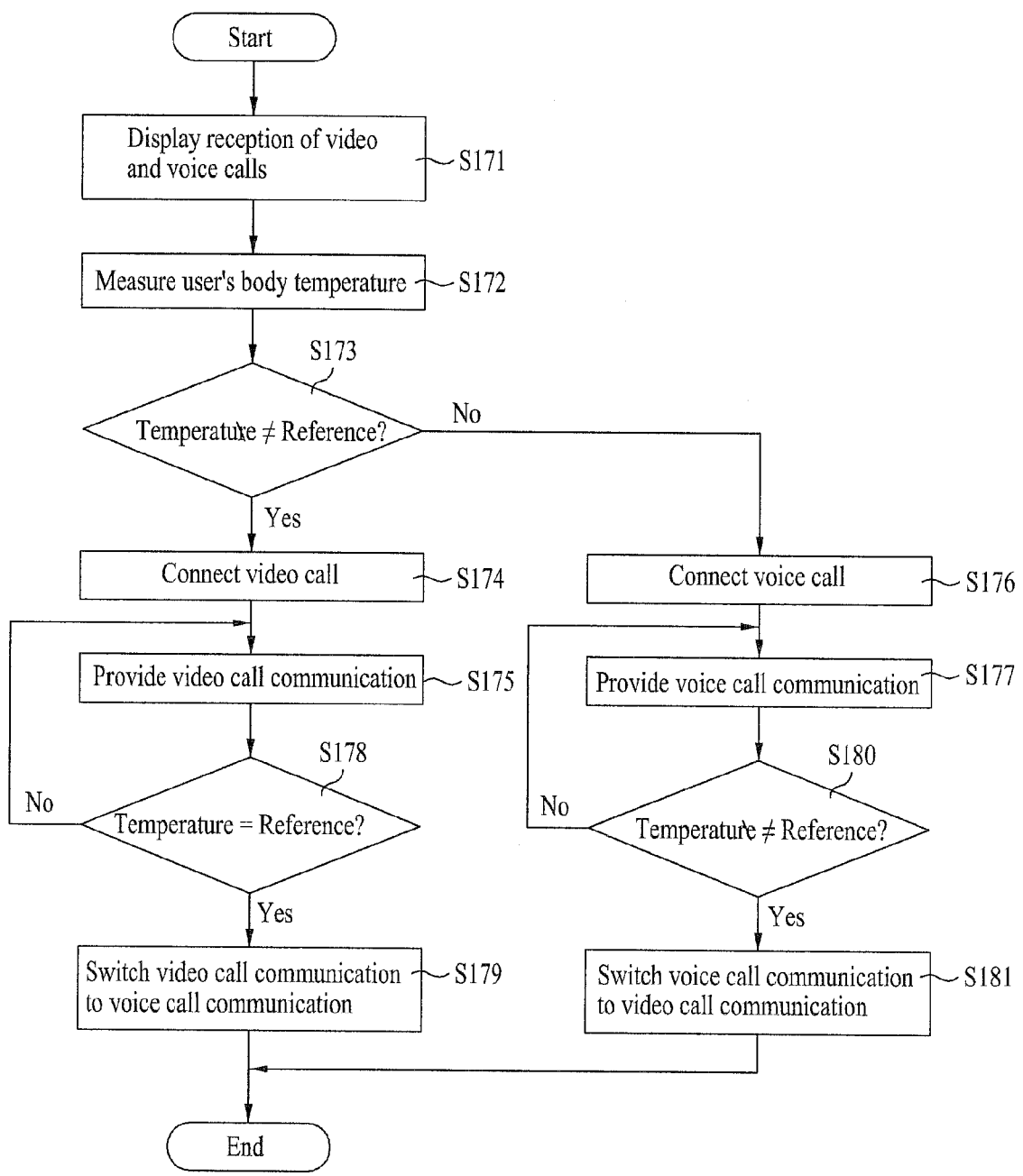
FIG. 14 is a flowchart of a method for switching a video call and a voice call using a heat detecting sensor according to an example embodiment of the present invention.

FIG. 14 is a flowchart of a method for switching a video call and a voice call using a heat detecting sensor according to an example embodiment of the present invention. Other embodiments, configurations and arrangements are also within the scope of the present invention.

The first and second informations 21 and 22 may be displayed in operation S171. The controller 180 may measure a temperature of a user for the terminal body contact through the heat detecting sensor 145 in operation S172.

If the heat measured via the heat detecting sensor 145 is not equal to a reference in operation S173, then the controller 180 may connect a video call in operation S174 by regarding that the first information 21 is selected. The controller 180 may then provide a call communication operation for the connected video call in operation S175.

The reference may be a temperature value corresponding to a user's body temperature.

When the measured temperature is not equal to the reference, this may be considered a state that the user does not hold the terminal body with fingers. The voice call communication may not be possible (or may be improbable) while the terminal body is not held with fingers. Hence, the controller 180 may provide the video call communication to the user.

If the heat measured via the heat detecting sensor 145 is equal to the reference as determined in operation S173, then the user may currently hold the terminal body with fingers. The controller 180 may connect a voice call in operation 176 by regarding that the second information 22 is selected. The controller 180 may then provide a call communication operation for the connected voice call in operation S177.

If the heat re-measured in the course of the video call communication (of operation S175) via the heat detecting sensor 145 is equal to the reference in operation S178, then this may mean that the user may currently hold the terminal body with fingers. Therefore, the controller 180 may switch the video call communication to the voice call communication in operation S179.

If the heat re-measured in the course of the video call communication (of operation S175) via the heat detecting sensor 145 is not equal to the reference in operation S180, then the user may not currently hold the terminal body with fingers. Since the video call communication is suitable for the state that the user does not hold the terminal body with fingers, the controller 180 may switch the voice call communication to the video call communication in operation S181.

Embodiments of the present invention may provide effects and/or advantages.

Since a calling terminal transmits both a video call and a voice call to a called terminal, it may not be necessary to select either a video call communication or a voice call communication. Therefore, embodiments may enable the video call communication or the voice call communication to be connected using a single send key.

A called terminal may be enabled to determine whether to perform a video call communication or a voice call communication with a calling terminal, thereby providing a user of the called terminal with various call communication functions.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present invention may cover the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal, comprising:
    a wireless communication module to receive a message from a calling terminal, the message including information regarding a video call and a voice call from the calling terminal;
    a display to display a first item and a second item, the first and second item indicating a video call reception and a voice call reception, respectively;
    a user input unit for a user to select one of the video call reception and the voice call reception by selecting one of the first item and the second item;
    a motion detecting sensor to detect motion of the terminal; and
    a controller to provide a call operation based on the selected video call reception or the selected voice call reception,
    to provide the video call when a first motion is detected by the motion detecting sensor, and
    to provide the voice call when a second motion is detected by the motion detecting sensor,
    wherein the controller is further configured to recognize a preferred call scheme set by the calling terminal for the video call and the voice call based on the information included in the received message, and to display one of the first and second items corresponding to the recognized preferred call scheme to be discriminated by adjusting at least one of a display size, a display color or a font size of one of the first and second items corresponding to the recognized preferred call scheme.

2. The terminal of claim 1, wherein the controller recognizes that the video call and the voice call are received when a first field of the received message includes a parameter value for a video call connection and a second field of the received message includes a parameter value for a voice call connection.

3. The terminal of claim 2, wherein the message comprises a call connection setting message, wherein the first field corresponds to a first bearer capability of the call connection setting message, and wherein the second field corresponds to a second bearer capability of the call connection setting message.

4. The terminal of claim 2, wherein the controller to recognize presence of the first field and the second field in the received message when the controller recognizes an identifier in the received message.

5. The terminal of claim 2, wherein the controller to distinctively display reception of the call corresponding to the field having a priority set thereto on the display when a priority for a call connection is set in either the first field or the second field.

6. A terminal comprising:
    a wireless communication module to receive a message from a calling terminal, the message including information regarding a video call and a voice call from the calling terminal;
    a display to display a first item and a second item, the first and second items indicating a video call reception and a voice call reception, respectively;
    a user input unit for a user to select one of the video call reception and the voice call reception by selecting one of the first and second items;
    a brightness detecting sensor to detect a light brightness around the terminal; and
    a controller to provide a call operation based on the selected video call reception or the selected voice call reception, to provide the voice call when the brightness detected by the brightness detecting sensor is equal to or less than a reference, and to provide the video call when the brightness detected by the brightness detecting sensor is greater than the reference, wherein the controller is further configured to recognize a preferred call scheme set by the calling terminal for the video call and the voice call based on the information included in the received message, and to display one of the first and second items corresponding to the recognized preferred call scheme to be discriminated by adjusting at least one of a display size, a display color or a font size of one of the first and second items corresponding to the recognized preferred call scheme.

7. A terminal comprising:

a wireless communication module to receive a message from a calling terminal, the message including information regarding a video call and a voice call from the calling terminal;

a display to display a first item and a second item, the first and second items indicating a video call reception and a voice call reception, respectively;

a user input unit for a user to select one of the video call reception and the voice call reception based by selecting one of the first and second items;

a distance detecting sensor to detect a distance between a user and the terminal; and a controller to provide a call operation based on the selected video call reception or the selected voice call reception, to provide the voice call when the distance detected by the distance detecting sensor is equal to or less than a reference, and to provide the video call when the distance detected by the distance detecting sensor is greater than the reference, wherein the controller is further configured to recognize a preferred call scheme set by the calling terminal for the video call and the voice call based on the information included in the received message, and to display one of the first and second items corresponding to the recognized preferred call scheme to be discriminated by adjusting at least one of a display size, a display color or a font size of one of the first and second items corresponding to the recognized preferred call scheme.

8. A terminal comprising:

a wireless communication module to receive a message from a calling terminal, the message including information regarding a video call and a voice call from the calling terminal;

a display to display a first item and a second item, the first and second items indicating a video call reception and a voice call reception, respectively;

a user input unit for a user to select one of the video call reception and the voice call reception by selecting one of the first and second items;

a heat detecting sensor to detect a temperature of a user; and a controller to provide a call operation based on the selected video call reception or the selected voice call reception;

to provide the voice call when the temperature detected by the heat detecting sensor is substantially equal to a reference value, and to provide the video call when the temperature detected by the heat detecting sensor is not equal to the reference value, wherein the controller is further configured to recognize a preferred call scheme set by the calling terminal for the video call and the voice call based on the information included in the received message, and to display one of the first and second items corresponding to the recognized preferred call scheme to be discriminated by adjusting at least one of a display size, a display color or a font size of one of the first and second items corresponding to the recognized preferred call scheme.

9. A method of providing a call in a terminal, the method comprising:

receiving a message from a calling terminal, the received message including information regarding a video call and a voice call;

displaying a first item and a second item, the first and second items indicating a video call reception and a voice call reception, respectively;

recognizing a preferred call scheme set by the calling terminal for the video call and the voice call based on the information included in the received message;

displaying one of the first and second items corresponding to the recognized preferred call scheme to be discriminated by adjusting at least one of a display size, a display color or a font size of one of the first and second items corresponding to the recognized preferred call scheme;

receiving an input from a user to select one of a video call connection and a voice call connection by selecting one of the first and second items;

performing an operation for a call connection based on the selected video call connection or the selected voice call connection; and providing the video call connection when a first motion is detected by a motion detecting sensor, and providing the voice call connection when a second motion is detected by the motion detecting sensor.

10. The method of claim 9, wherein the controller recognizes that the information regarding the video call and the voice call are received when a first field of the received message includes a parameter value for the video call connection and a second field of the received message includes a parameter value for the voice call connection.

11. The method of claim 10, wherein the message comprises a call connection setting message, wherein the first field corresponds to a first bearer capability of the call connection setting message, and wherein the second field corresponds to a second bearer capability of the call connection setting message.

12. The method of claim 10, wherein the controller to recognize presence of the first field and the second field in the received message when the controller recognizes an identifier in the received message.

13. The method of claim 10, further comprising displaying reception of the call corresponding to the field having a priority set thereto when a priority for a call connection is set in either the first field or the second field.

14. A method of providing a call in a terminal, the method comprising:

receiving a message from a calling terminal, the received message including information regarding a video call and a voice call;

displaying a first item and a second item, the first and second items indicating a video call reception and a voice call reception, respectively;

recognizing a preferred call scheme set by the calling terminal for the video call and the voice call based on the information included in the received message;

displaying one of the first and second items corresponding to the recognized preferred call scheme to be discriminated by adjusting at least one of a display size, a display color or a font size of one of the first and second items corresponding to the recognized preferred call scheme;

receiving an input from a user to select one of a video call connection and a voice call connection by selecting one of the first and second items;

performing an operation for a call connection based on the selected video call connection or the selected voice call connection; and providing the voice call connection when a brightness detected by a brightness detecting sensor is equal to or less than a reference value, and providing the video call connection when the brightness detected by the brightness detecting sensor is greater than the reference value.

15. A method of providing a call in a terminal, the method comprising:

receiving a message from a calling terminal, the received message including information regarding a video call and a voice call;

displaying a first item and a second item, the first and second items indicating a video call reception and a voice call reception, respectively;

recognizing a preferred call scheme set by the calling terminal for the video call and the voice call based on the information included in the received message;

displaying one of the first and second items corresponding to the recognized preferred call scheme to be discriminated by adjusting at least one of a display size, a display color or a font size of one of the first and second items corresponding to the recognized preferred call scheme;

receiving an input from a user to select one of a video call connection and a voice call connection by selecting one of the first and second items;

performing an operation for a call connection based on the selected video call connection or the selected voice call connection; and providing the voice call connection when a distance detected by a distance detecting sensor is equal to or less than a reference value, and providing the video call connection when the distance detected by the distance detecting sensor is greater than the reference value.

16. A method of providing a call in a terminal, the method comprising:

receiving a message from a calling terminal, the received message including information regarding a video call and a voice call;

displaying a first item and a second item, the first and second items indicating a video call reception and a voice call reception, respectively;

recognizing a preferred call scheme set by the calling terminal for the video call and the voice call based on the information included in the received message;

displaying one of the first and second items corresponding to the recognized preferred call scheme to be discriminated by adjusting at least one of a display size, a display color or a font size of one of the first and second items corresponding to the recognized preferred call scheme;

receiving an input from a user to select one of a video call connection and a voice call connection by selecting one of the first and second items;

performing an operation for a call connection based on the selected video call connection or the selected voice call connection; and providing the voice call connection when a heat detected by a heat detecting sensor is substantially equal to a reference value, and providing the video call connection when the heat detected by the heat detecting sensor is not equal to the reference value.

* * * * *